(12) United States Patent
Ruana

(10) Patent No.: US 6,854,163 B1
(45) Date of Patent: Feb. 15, 2005

(54) RELEASABLY ATTACHABLE GRIP

(76) Inventor: Bruce M. Ruana, 1781 Bitterbrush Ct., Gardnerville, NV (US) 89410

( * ) Notice: Subject to any disclaimer, the term of this patent is extended or adjusted under 35 U.S.C. 154(b) by 0 days.

(21) Appl. No.: 10/145,566

(22) Filed: May 13, 2002

Related U.S. Application Data (63) Continuation-in-part of application No. 09/874,940, filed on Jun. 4, 2001.

(51) Int. Cl.$^7$ .......................... B62K 21/26; B63B 7/00; B63B 7/02; B63B 7/12
(52) U.S. Cl. ................. 16/431; 16/DIG. 12; 74/551.9; 74/558.5; 116/1; 116/202; 116/278
(58) Field of Search ................... 16/431, 435, DIG. 12, 16/DIG. 19; 74/551.8, 551.9, 558.5; 442/370; 116/1, 202, 278

(56) References Cited

U.S. PATENT DOCUMENTS

| | | | |
|---|---|---|---|
| 3,848,480 A | * 11/1974 | Oseroff et al. ............. | 74/558.5 |
| 4,044,625 A | 8/1977 | D'Haem et al. ........... | 74/558.5 |
| 4,054,001 A | 10/1977 | De Pinna .................. | 40/126 A |
| 4,102,377 A | 7/1978 | Ostrem ...................... | 74/558.5 |
| 4,191,298 A | 3/1980 | Broudy ....................... | 211/126 |
| 4,308,762 A | * 1/1982 | Jannard ...................... | 74/551.9 |
| 4,416,166 A | * 11/1983 | Jannard et al. ............ | 74/551.9 |
| 4,941,369 A | * 7/1990 | Specht et al. .............. | 74/551.9 |
| 5,042,318 A | 8/1991 | Franz ......................... | 74/558.5 |
| 5,065,837 A | * 11/1991 | Szudy ........................ | 182/18 |
| 5,074,165 A | 12/1991 | Keller ....................... | 74/558.5 |
| 5,190,267 A | 3/1993 | Schmitt et al. ............... | 256/59 |
| 5,234,740 A | 8/1993 | Reeves et al. ......... | 16/DIG. 12 |
| 5,243,457 A | * 9/1993 | Spencer ...................... | 119/795 |
| 5,253,557 A | 10/1993 | Dolak ........................ | 16/430 |
| RE34,590 E | 4/1994 | Schotthoefer ............... | 156/226 |
| 5,390,766 A | * 2/1995 | Martin ........................ | 187/396 |
| 5,491,015 A | 2/1996 | Reeves et al. ......... | 16/DIG. 12 |
| 5,511,445 A | 4/1996 | Hildebrandt .................. | 16/421 |
| 5,584,096 A | 12/1996 | Aurora ..................... | 16/111 R |
| 5,584,482 A | * 12/1996 | Huang ........................ | 473/301 |
| 5,687,424 A | * 11/1997 | Masley .......................... | 2/163 |
| 5,743,064 A | 4/1998 | Bennett ................... | 52/718.04 |
| 5,775,016 A | 7/1998 | Chien .......................... | 40/584 |
| 5,775,756 A | 7/1998 | Rozenich .................... | 294/137 |
| 5,779,228 A | 7/1998 | Hansen ........................ | 256/65 |
| 6,017,830 A | 1/2000 | Brown et al. ................. | 442/43 |
| 6,025,773 A | 2/2000 | Bresnan .................. | 340/407.1 |
| 6,041,533 A | 3/2000 | Lemmond, Jr. .............. | 40/584 |
| 6,062,519 A | 5/2000 | Baldassarre ............. | 248/311.2 |
| 6,065,852 A | 5/2000 | Crumley ..................... | 362/146 |
| 6,115,985 A | 9/2000 | Wu .......................... | 52/720.2 |
| 6,362,387 B1 | 3/2002 | Carlson et al. ............ | 442/370 |
| 6,421,879 B1 | 7/2002 | Grätz et al. ................... | 16/422 |
| 6,472,994 B1 | * 10/2002 | Tator ....................... | 340/815.4 |
| 6,485,159 B2 | 11/2002 | Pitts ............................ | 362/84 |

OTHER PUBLICATIONS

The Answer: FLOORRads™, [Internet] http://floorgraphics.com/site1 solution top f.html, printed Apr. 22, 2001, pp. 1–14.

(List continued on next page.)

Primary Examiner—Thomas B. Will
Assistant Examiner—Tara L. Mayo
(74) Attorney, Agent, or Firm—Sierra Patent Group, Ltd.

(57) ABSTRACT

A releasably attachable grip comprises a body having a first side and a second side opposite the first side. The grip also comprises a light emitter integral with the first side of the body. The grip also comprises a stretchable material having a top surface and a bottom surface opposite the top surface. The top surface is adhered to the second side of the body. The grip also comprises a releasable adhesive disposed on the bottom surface of the stretchable material. The releasable adhesive is configured to adhere to the outer surface.

12 Claims, 9 Drawing Sheets

OTHER PUBLICATIONS

"Plastatech, Expanded Vinyls", [Internet] http://222.plastatech.com/pt/home.nsf/public/Expanded Vinyls.htm., printed May 21, 2001, pp. 1–2.

"Polartec: New Fabrics", [Internet] http://polartec.com/fabrics/new.php, 3 pages, printed Oct. 23, 2002.

"Lycra © Spandex Fabric Information (from KWIK SEW Swim & Action Wear Book)" [Internet] http://www.quicksew.com/books/SwimFabric.htm, 2 pages, printed Oct. 2002.

"Italian Nylon Lycra", [Internet] http://www.seattlefabrics.com/stgretch body.html, 6 pages, printed Oct. 23, 2002.

"Double Stretch Spandex:: Four–way stretch spandex,light in weight. 60" wide", [Internet] http://www.costomersquarterly.com/pages/fabrics/spandex/double stretch spandex.html, 2 pages, printed Oct. 23, 2002.

"Fabric.com" Home Page and "Fabric.com pages with items from search for four–way stretch", [Internet] http://search.store.yahoo.com/cgi–bin/nsearch?catalog=phoenixtextiles&query=four–way+stretch&autodone=http%3A%F%2Fstore.yahoo.com%2Fphoenixtextiles%Fnsearch.html, 5 pages, printed Oct. 23, 2002.

"Outdoor Wilderness Fabrics Inc.: Lycra Blends", [Internet] http://www.owfinc.com/Fabrics/Nylon%20Woven/lycra.asp, 2 pages, printed Oct. 23, 2002.

"Polartec© Power Stretch©", [Internet] http://www.melanzana.com/fleece–polyester–fabric.htm, 1 page, printed Oct. 23, 2002.

"Wyoming Wear Power Sports Socks", [Internet] http://www.wyomingwear.com/powersports.html., 1 page, printed Oct. 23, 2002.

"Jagged Edge Pumori Power Stretch Bottom", [Internet] http://gearoom.com/reviews/clothing/jedge pumori bot.html, 1 page, printed Oct. 23, 2002.

"Web Foots Body Sock® Style 4", [Internet]http://www.cdsportswear.com/wf style4.htm, 1 page, printed Oct. 23, 2002.

* cited by examiner

RELEASABLY ATTACHABLE GRIP

CROSS-REFERENCE TO RELATED APPLICATIONS

This application is a continuation-in-art of U.S. patent application Ser. No. 09/874,940, filed Jun. 4, 2001.

BACKGROUND

1. Field of the System

The present invention relates to grips for hand railings or other hand support systems. More specifically, the present invention relates to grips which are releasably adhered to railings or other hand support systems.

2. Prior Art

Hand railings are in use throughout the world to assist in human activity such as standing, sitting down, ascending and descending a stairway, entering or exiting a moving vehicle, walking, etc. Maintaining a secure, comfortable grip is extremely important when operating or using various hand-held apparatuses or, more importantly, simply for safety purposes when grasping any type of railing. Bare railings are used for hand supports by users, standing, or sitting, or while entering or exiting a vehicle. Bare railings, whether they are constructed from any type of metal, plastic, wood, glass, concrete or composite material can be slippery, or coarse and inconvenient to hold onto with bare hands. Furthermore, uncovered railings located in moving vehicles such as subway train cars, light rail transit cars, transit buses, trams, street cars, trolley cars, recreational vehicles, etc., are unsafe when the vehicle is in motion and especially when turning. Typically, such railings are extruded shapes, such as a circular tube or another similar shape made for the human hand to grasp. Additionally, these railings are usually constructed from durable metal, such as stainless steel, but may also be constructed from wood or various other substances.

Such typical hand railings, however, do not provide a positive gripping surface, which would still further assist in the corresponding human activity associated with the hand railing. Some of the present gripping devices include molded plastic cylindrical grips which are installed and include cross-sectional sections designed to fit the human hand as in U.S. Pat. No. 5,584,096 to Auroura, rigid hand railings having a plurality of finger sized indentations, U.S. Pat. No. 5,190,267 to Schmitt, et al. and rail covering systems for outdoor decks as in U.S. Pat. No. 6,062,519 to Baldassarre. Still other gripping devices include removable foam grips that are wrapped around a bar each time a user wishes to use a bar as in U.S. Pat. No. 5,775,756 to Rozenich. This type of grip is typically used for weightlifting equipment. The grips to date involve either railings with built in grips or grips that are, for the most part, permanently attached to the railings, while other grips are not attached at all, rather they are easily removed and transferred from bar to bar.

To date, no grips have been designed which will conform to any railing surface or shape and which are releasably attachable to such railing surface. Hence, there is a need for a grip which will conform to any railing type and which will attach to any railing surface regardless of the type of surface or type of material used as the grip and a grip which is releasably attachable to the railing.

Further, to date no grips have been designed that have safety features incorporated into the grip, which will enable a user to use the grip to achieve safety even in the most detrimental conditions. Hence, there is a need for a grip which has textured surfaces to generate additional friction for gripping, some of which are readable to vision impaired persons, illuminated surfaces to guide the user to safety, sound emitting technology incorporated within the grip to guide the user to safety, and anti-bacterial agents to prevent the spread of disease.

SUMMARY OF THE INVENTION

The present invention is a method, system and device for providing a secure, resilient gripping surface on a railing or other hand support system. The grip of the present invention is designed to provide a secure, resilient gripping surface on any railing or hand support system surface that is grasped by a hand. The grip is preferably utilized on a railing or other hand support system. However, it is readily apparent that the grip could also be used on other structures, such as support poles and beams, etc.

In one aspect of the present invention, a flexible gripping pad is provided which is easily secured to a railing or hand support system by wrapping the grip around the railing or hand support system. The grip may fully cover the railing, or it may be artfully wrapped or it may be partially or fully folded. The grip of this invention will provide a comfortable, resilient gripping surface which will enhance the safety of a railing or hand support system by preventing slipping, hand abrasions or other dangers associated with railings or hand support systems.

In one aspect, the grip of the present invention comprises a skin layer having a top surface and a bottom surface, and a 4-way stretchable material layer having a top surface and a bottom surface. The top surface of the 4-way stretchable material layer is permanently adhered to the bottom surface of the skin layer. The bottom surface of the 4-way stretchable material layer is releasably attached to the railing or hand support system.

The skin layer may be formed from any material which will provide a safe and secure gripping surface. Some examples of possible skin materials include expanded vinyl, which is vinyl with a layer of foam that imparts a soft, textured feel, leather, plastic sheeting, plastic roll stock, any type of foam product, polyurethane, urethane, woven fabrics, rubber material and foil material. If a vinyl material is used, the vinyl may be supported or unsupported. Similarly, the 4-way stretchable material may comprise any material that can be simultaneously stretched in four directions, such as a polyester material.

In yet another aspect of the present invention, the skin layer of the grip of the present invention has a luminescent quality. The luminescent skin layer glows in the dark to provide additional safety in cases of an emergency.

In another embodiment, the grip of the present invention comprises a skin layer having a top surface and a bottom surface, and a backing layer having a top surface and a bottom surface. The top surface of the backing layer is permanently adhered to the bottom surface of the skin layer. Furthermore, the backing layer is permanently attached to a 4-way stretchable material layer with a stretchable top surface and a stretchable bottom surface. The bottom surface of the 4-way stretchable material layer is releasably attached to the railing or hand support system.

The grip of the present invention may have tapered edges on its lengthwise sides so that when the grip is spirally wrapped around a railing or other hand support system and the edges overlap, the thickness of the grip remains constant. As an alternative to wrapping the grip such that the edges overlap, the grip may be wrapped so that the edges do not overlap, thus providing additional friction for the user.

One method of manufacturing the grip of the present invention comprises providing a skin layer which has a top surface for gripping and a bottom surface to which a permanent adhesive applied. Next, a 4-way stretchable material that has a top surface and a bottom surface is permanently attached to the bottom surface of the skin layer. Finally, the bottom surface of the 4-way stretchable material is releasably adhered to the railing.

Another method of manufacturing the grip of the present invention comprises providing a skin layer which has a top surface for gripping and a bottom surface to which a permanent adhesive is applied. Next, a backing layer is provided, which has a top surface and a bottom surface. The top surface of the backing layer is adhered to the bottom surface of the skin layer. Next, a 4-way stretchable material layer with a top surface and a bottom surface is permanently attached to the backing layer by adhering the backing layer bottom surface to the 4-way stretchable layer top surface. Finally, the 4-way stretchable material is releasably adhered to the railing.

The system of the present invention is designed for providing a secure, safe, releasably attachable grip on a railing. The system comprises a grip having a 4-way stretchable layer with an inner surface and an outer surface and a skin layer with an inner surface and an outer surface, the inner surface of the skin layer is adhered to the outer surface of the 4-way stretchable layer. The inner surface of the 4-way stretchable layer is releasably adhered to the railing.

Another system of the present invention is also designed for providing a secure, safe, releasably attachable grip on a railing. The system comprises a grip having a backing layer with an inner surface and an outer surface and a skin layer with an inner surface and an outer surface, the inner surface of the skin layer is adhered to the outer surface of the backing layer. The bottom surface of the backing layer is permanently adhered to a 4-way stretchable layer with an inner surface and an outer surface. The inner surface of the 4-way stretchable layer is releasably adhered to the railing.

As set forth above, the grip of the present invention may have tapered edges on its lengthwise sides so that when the grip is wrapped around a railing or other hand support system and the edges overlap, the thickness of the grip remains constant. As an alternative to wrapping the grip such that the edges overlap, the grip may be wrapped so that the edges do not overlap, thus providing additional friction for the user.

One method of placing the grip of the present invention on the railing comprises providing a railing and wrapping the tapered edge grip of the present invention spirally around the railing such that the tapered edges of the grip overlap. The length of the railing may be fully covered by the grip such that the thickness of the grip remains constant or, in the alternative, the edges may not overlap to provide additional friction for the user.

Another method of placing the grip of the present invention on a railing comprises providing a railing having a length and alignment targets in a parallel line along its length. Next, placing the grip so that the center lengthwise axis of the grip is centered on the axis parallel to the length of the railing. The grip of the present invention has alignment targets disposed along an axis parallel to the lengthwise edge of the grip and the grip folds around the railing such that the alignment targets of the grip align with the alignment targets of the railing and the edges of the grip abut when folded around the railing.

The grip of this invention will provide a positive gripping surface for any type of railing using any type of material as a grip and provide a safe, uniform gripping surface for the length of the railing's surface. Moreover, there is a need for a method of manufacturing for grips and a system for providing grips which are releasably adhered to a railing or hand support system. Finally, there is a need for a method of placing the grip of the present invention on to a railing or other hand support system.

DETAILED DESCRIPTION

Figure 1:
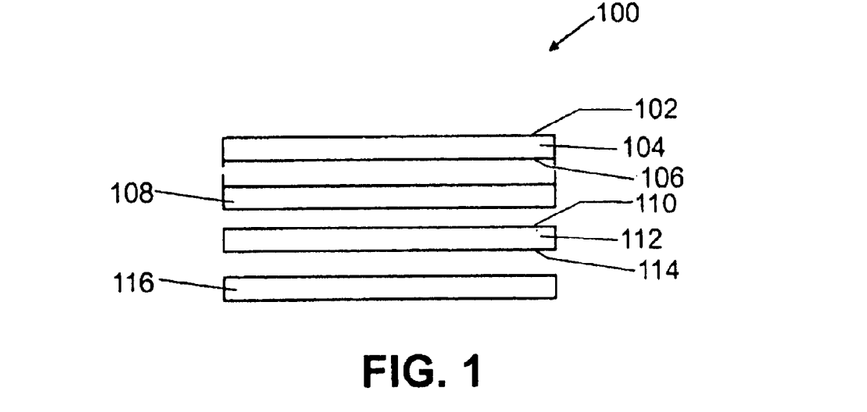
FIG. 1 is a side view of an embodiment of the grip.

FIG. 1 discloses grip 100 for use on a railing or hand support system. Grip 100 has a skin layer 104 and a 4-way stretchable layer 112. Skin layer 104 has a top surface 102 which provides a comfortable, secure and safe gripping surface. Skin layer 104 can be formed from a variety of materials. Examples of such materials include expanded vinyl, which is vinyl with a layer of foam that imparts a soft, textured feel, leather, plastic sheeting, plastic roll stock, any type of foam product, polyurethane, urethane, woven fabrics, rubber material, foil material or any other material which could act as a covering to a hand support system. If skin layer 104 is formed from expanded vinyl, the vinyl surface may be smooth or textured. In addition, if a vinyl material is used, the vinyl may be supported or unsupported. In yet another aspect of the present invention, skin layer 104 of grip 100 of the present invention has a luminescent quality. The luminescent skin layer glows in the dark to provide additional safety in cases of an emergency. Any methods known in the art for creating luminescence may be used, for example some of the methods include transfer application processes, wet ink processes and sublimation ink processes. In yet another embodiment of the invention, skin layer 104 has an antibacterial agent, such as Benzothiazoline (BIT), Octylisothiazoline (OIT), Thiabendez (TBZ), or zinc pyrithionoxide (ZPT), added to the skin layer of the grip. The antibacterial agent may be added in different concentrations depending on where the grip is used.

Four-way stretchable layer 112 has top surface 110 and a bottom surface 114, such that top surface 110 of 4-way stretchable layer 112 conforms to and is permanently affixed to bottom surface 106 of skin layer 104. 4-way stretchable layer 112 may be comprised of any material that can simultaneously stretch in four directions such as a polyester material. Bottom surface 114 of 4-way stretchable layer 112 is releasably attached to the railing or hand support system by a layer of releasable adhesive 116. Releasable adhesive 116 completely covers from edge to edge and is affixed to 4-way stretchable layer 112 and provides releasable adhesion to the railing or hand support system. Releasable adhesive 116 provides secure adhesion to the railing or hand support system but may be removed with a minimal amount of effort by peeling grip 100 off the railing or hand support system. Any adhesive having the characteristics of being secured to the railing as well as being easily removed can be utilized; a preferred example of a releasable adhesive is FLEXCON® V-58.

Skin layer 104 has a bottom surface 106 which is affixed to the top surface 110 of 4-way stretchable material layer 112 by a permanent adhesive 108 that completely covers skin layer 104 from edge to edge. The permanent adhesive 108 can be any permanent adhesive known in the art, which will permanently bond skin layer 104 to 4-way stretchable material layer 112. An example of such a permanent adhesive is FLEXCON® adhesive V-402. However, it will be clear to one skilled in the art that other similar sitable adhesives may be used.

Figure 2:
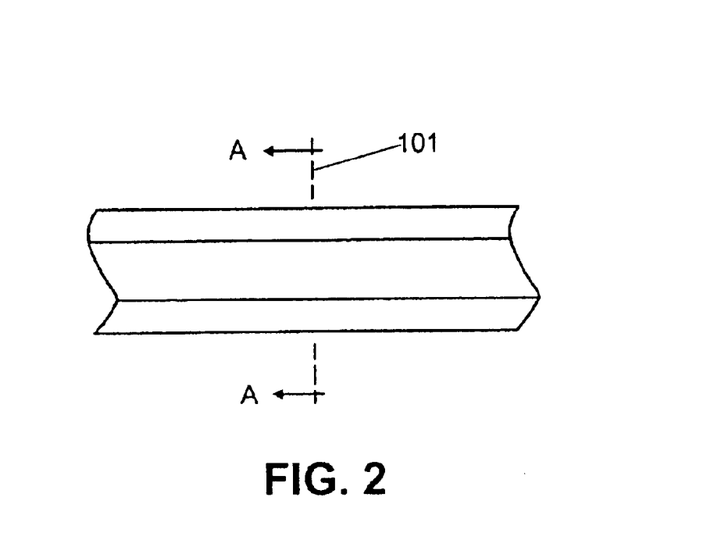
FIG. 2 is perspective view of the grip of FIG. 1.
Figure 3:
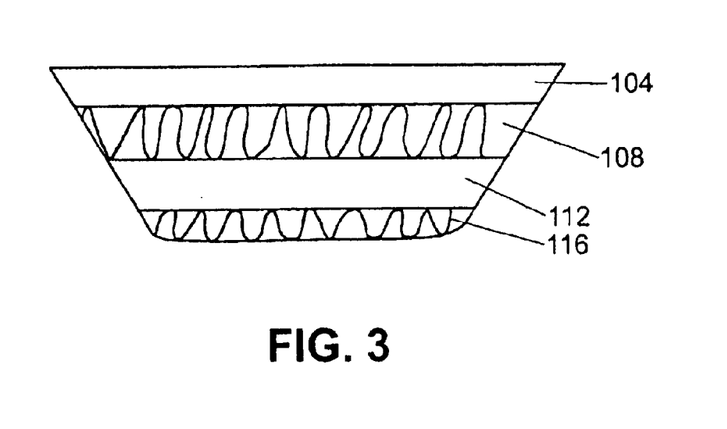
FIG. 3 is a cross-sectional view of the grip if FIG. 2 taken along the line A—A.

In one embodiment of grip 100 disclosed in FIG. 3, the lengthwise edges of skin layer 104 and 4-way stretchable layer 112 may be tapered in thickness. FIG. 2 discloses a top view of grip 100. FIG. 3 discloses a cross sectional view of grip 100 taken from cross sectional line A to A 101 of FIG. 2. Tapering the edges of skin layer 104 and 4-way stretchable layer 112 allows for the edges to overlap when wrapping a railing or hand support system and at the same time to maintain a constant thickness of grip 100 despite the overlapping edges. In another embodiment, the edges are tapered but wrapped in such a way that they do not overlap to provide still more friction for the user. In still another embodiment, the lengthwise edges of skin layer 104 and 4-way stretchable layer 112 are not tapered for instances when the edges do not overlap.

Figure 4:
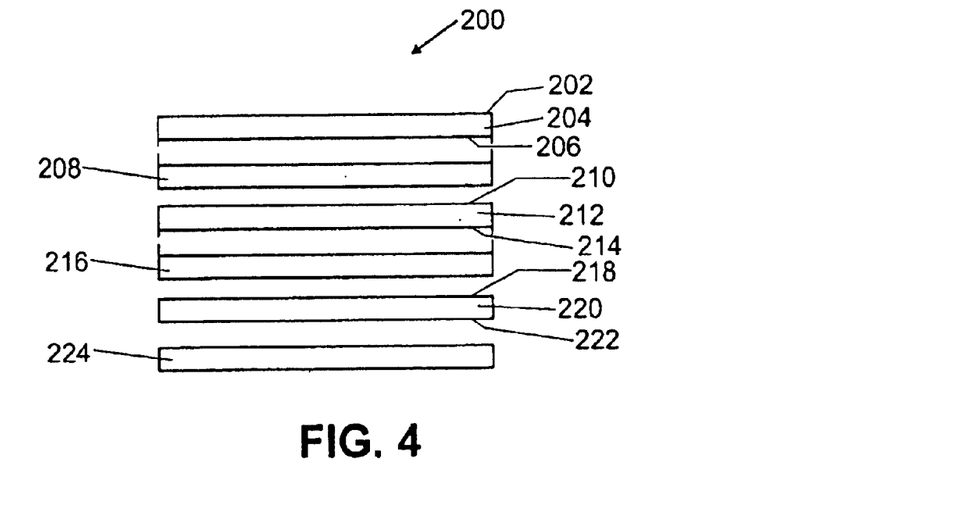
FIG. 4 is a side view of another embodiment of the grip.

FIG. 4 discloses another embodiment of the present invention. Grip 200 has a skin layer 204, a backing layer 212 and a 4-way stretchable layer 220. Skin layer 204 has a top surface 202 which provides a comfortable, secure and safe gripping surface. Skin layer 204 can be formed from a variety of materials. Examples of such materials include, but are not limited to, expanded vinyl, which is vinyl with a layer of foam that imparts a soft, textured feel, leather, plastic sheeting, plastic roll stock, any type of foam product, polyurethane, urethane, woven fabrics, rubber material, foil material or any other material which could act as a covering to a hand support system. If skin layer 204 is formed from expanded vinyl, the vinyl surface may be smooth or textured. In addition, if a vinyl material is used, the vinyl may be supported or unsupported. In yet another aspect of the present invention, skin layer 204 of grip 200 of the present invention has a luminescent quality. The luminescent skin layer glows in the dark to provide additional safety in cases of an emergency. Any methods known in the art for creating luminescence may be used, for example some of the methods include transfer application processes, wet ink processes and sublimation ink processes. In yet another embodiment of the invention, skin layer 204 has an antibacterial agent, such as Benzothiazoline (BIT), Octylisothiazoline (OIT), Thiabendez (TBZ), or zinc pyrithionoxide (ZPT), added to the skin layer of the grip. The antibacterial agent may be added in different concentrations depending on where the grip is used.

Backing layer 212 has a top surface 210 and a bottom surface 214, such that top surface 210 of backing layer 212 conforms to and is affixed to bottom surface 206 of skin layer 204. Backing layer 212 may be comprised of any material suitable for providing support including open cell foam, closed cell foam, felt, paper or rubber. Bottom surface 214 of backing layer 212 is permanently adhered to the top surface 218 of 4-way stretchable material 220. The permanent adhesive attaching bottom surface 214 of backing layer 212 to top surface 218 of 4-way stretchable material 220 can be any permanent adhesive known in the art which will permanently bond the surfaces an example of which is FLEXCON® V-402. Four-way stretchable material 220 has the ability to stretch in all directions simultaneously. An example of a 4-way stretchable material is a polyester material. Bottom surface 222 of 4-way stretchable layer 220 is releasably attached to the railing or hand support system by releasable adhesive 224. Releasable adhesive 224 is affixed to and completely covers 4-way stretchable material 220 from edge to edge and provides releasable adhesion to the railing or hand support system. Releasable adhesive 224 provides secure adhesion to the railing or hand support system. but may be removed with a minimal amount of effort by peeling grip 200 off the railing or hand support system. Any adhesive having the characteristics of being secured to the railing as well as being easily removed can be utilized; a preferred example of a releasable adhesive is FLEXCON® V-58.

Skin layer 204 has a bottom surface 206 which is affixed to top surface 210 of backing layer 212 by a permanent adhesive 208 which completely covers bottom surface 214 backing layer 212 from edge to edge. The permanent adhesive 208 can be any permanent adhesive known in the art, which will permanently bond skin layer 204 to backing layer 212. An example of such a permanent adhesive is FLEXCON® adhesive V-402. However, it will be clear to one skilled in the art that other similar suitable adhesives may be used.

Figure 5:
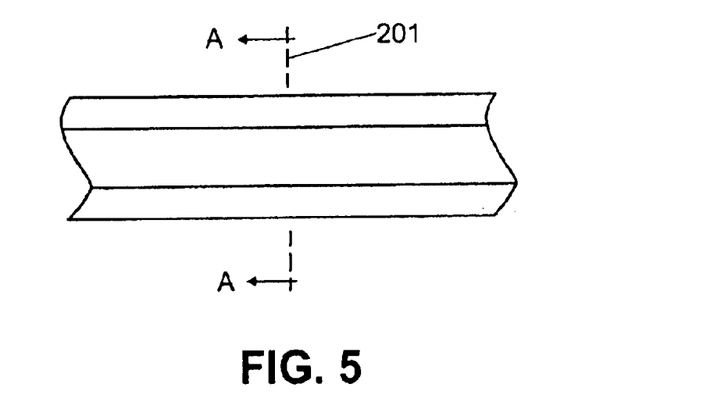
FIG. 5 is perspective view of the grip of FIG. 4.
Figure 6:
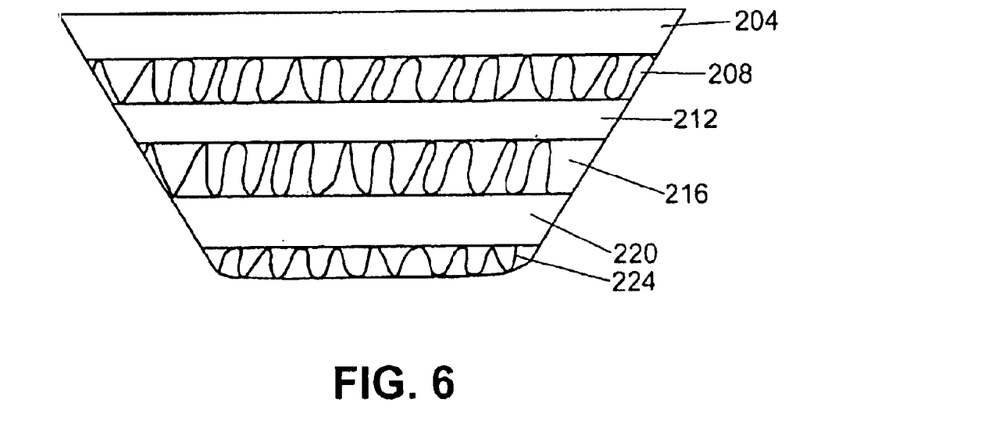
FIG. 6 is a cross-sectional view of the grip if FIG. 4 taken along the line A—A.

In one embodiment of grip 200 disclosed in FIG. 4, the lengthwise edges of skin layer 204, backing layer 212 and 4-way stretchable layer 220 may be tapered in thickness. FIG. 5 discloses a top view of grip 200. FIG. 6 discloses a cross sectional view of grip 200 taken from cross sectional line A to A 201 of FIG. 5. Tapering the edges of skin layer 204, backing layer 212 and 4-way stretchable layer 220 allows for the edges to overlap when wrapping a railing or hand support system and at the same time to maintain a constant thickness of grip 200 despite the overlapping edges. In another embodiment, the edges are tapered but wrapped in such a way that they do not overlap to provide still more friction for the user. In still another embodiment, the lengthwise edges of skin layer 204, backing layer 212 and 4-way stretchable layer 220 are not tapered for instances when the edges do not overlap but a consistent thickness of grip is desired.

In one embodiment of the method of manufacture of grip 100 disclosed in FIG. 3, the lengthwise edges of skin layer 104 and 4-way stretchable layer 112 may be tapered in thickness. FIG. 2 discloses a top view of grip 100. FIG. 3 discloses a cross sectional view of grip 100 taken from cross sectional line A to A 101 of FIG. 2. Tapering the edges of skin layer 104 and 4-way stretchable layer 112 allows for the edges to overlap when wrapping a railing or hand support system and at the same time to maintain a constant thickness of grip 100 despite the overlapping edges. In another embodiment, the edges are tapered but wrapped in such a way that they do not overlap to provide still more friction for the user. In still another embodiment, the lengthwise edges of skin layer 104 and 4-way stretchable layer 112 are not tapered for instances when the edges do not overlap.

Figure 7A:
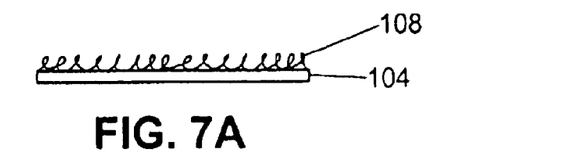
FIGS. 7a-7c show a method or procedure for manufacture of the grip of FIG. 1.
Figure 7B:
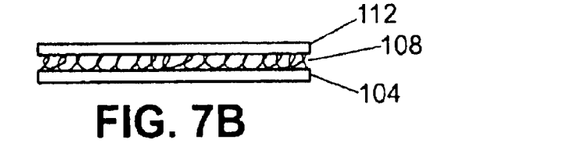
Figure 7C:
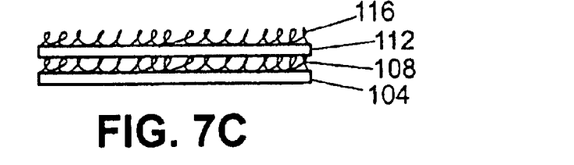

FIGS. 7a-7c disclose a method or procedure for manufacture of grip 100. For convenience, the component parts of grip 100 are numbered as in FIG. 1 designating grip 100. The method or procedure for manufacture of grip 100 begins with the act 7a of providing a skin layer 104 and applying permanent adhesive 108 to skin layer 104. Skin layer 104 can be formed from a variety of materials. Examples of such materials include expanded vinyl, which is vinyl with a layer of foam that imparts a soft, textured feel, leather, plastic sheeting, plastic roll stock, any type of foam product, polyurethane, urethane, woven fabrics, rubber material, foil material or any other material which could act as a covering to a hand support system. If skin layer 104 is formed from expanded vinyl, the vinyl surface may be smooth or rough. In addition, if a vinyl material is used, the vinyl may be supported or unsupported. Next 4-way stretchable material layer 112 is permanently adhered to skin layer 104 as disclosed in FIG. 7b. As previously set forth, 4-way stretchable layer 112 may be comprised of any material that can simultaneously stretch in four directions such as a polyester material. Then a releasable adhesive 116 is applied from edge to edge to 4-way stretchable material layer 112.

Figure 8A:
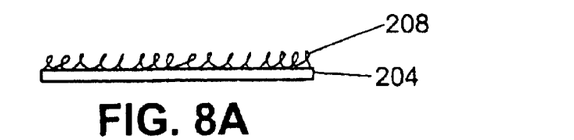
FIGS. 8a-8e show a method or procedure for manufacture of the grip of FIG. 4.
Figure 8B:
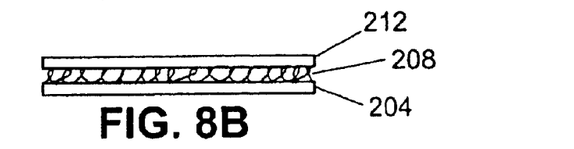
Figure 8C:
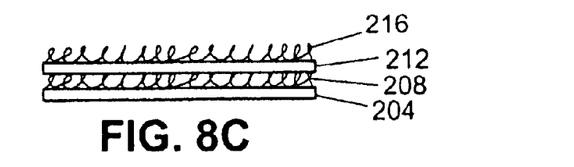
Figure 8D:
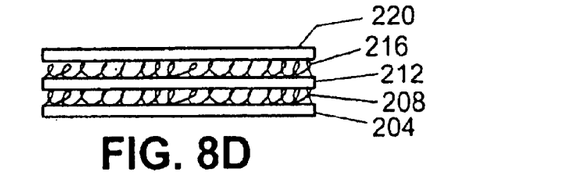
Figure 8E:
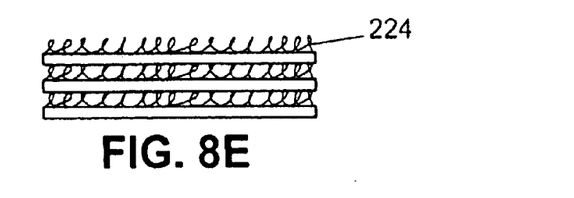

FIGS. 8a-8e discloses a method or procedure for manufacture of grip 200. For convenience, the component parts of grip 200 are numbered as in FIG. 4 designating grip 200. The method or procedure for manufacture of grip 200 begins with the act 8a of providing a skin layer 204 and applying permanent adhesive 208 from edge to edge of skin layer 204. Skin layer 204 can be formed from a variety of materials. Examples of such materials include, but are not limited to, expanded vinyl, which is vinyl with a layer of foam that imparts a soft, textured feel, leather, plastic sheeting, plastic roll stock, any type of foam product, polyurethane, urethane, woven fabrics, rubber material, foil material or any other material which could act as a covering to a hand support system. If skin layer 204 is formed from expanded vinyl, the vinyl surface may be smooth or rough. In addition, if a vinyl material is used, the vinyl may be supported or unsupported. Next backing layer 212 is permanently adhered to skin layer 204 as disclosed in FIG. 8b. As previously set forth, backing layer 212 may be comprised of any material suitable for providing support including open cell foam, closed cell foam, felt, paper or rubber. Next, as disclosed in FIG. 8c, permanent adhesive 216 is applied to backing layer 212. Then, as shown in FIG. 8d, 4-way stretchable layer 220 is adhered to backing layer 212. Finally, as disclosed in FIG. 8e, a releasable adhesive 224 is applied from edge to edge to 4-way stretchable layer 220.

In one embodiment of the method of manufacture of grip 200 disclosed in FIG. 4, the lengthwise edges of skin layer 204, backing layer 212 and 4-way stretchable layer 220 may be tapered in thickness. FIG. 5 discloses a top view of grip 200. FIG. 6 discloses a cross sectional view of grip 200 taken from cross sectional line A to A 201 of FIG. 5. Tapering the edges of skin layer 204, backing layer 212 and 4-way stretchable material layer 220 allows for the edges to overlap when wrapping a railing or hand support system with grip 200 and at the same time to maintain a constant thickness of grip 200 despite the overlapping edges. In another embodiment, the edges are tapered but wrapped in such a way that they do not overlap to provide still more friction for the user. In still another embodiment, the lengthwise edges of skin layer 204, backing layer 212 and 4-way stretchable layer 220 are not tapered for instances when the edges do not overlap.

Figure 9:
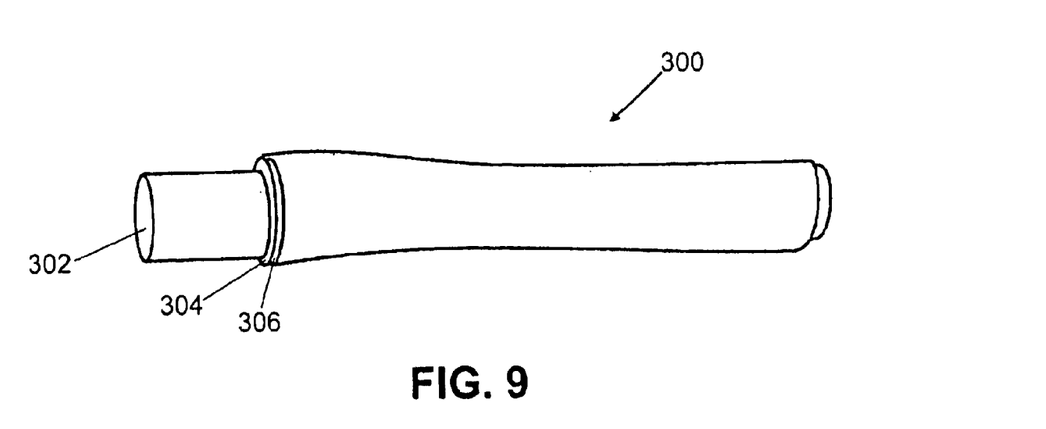
FIG. 9 shows a method of wrapping the grip of FIG. 1.

FIG. 9 discloses a system of providing a secure, safe, releasably attachable grip on a railing. The system of the present invention can be utilized with any type of railing or hand support system 302. Grip 300 of the present invention has a 4-way stretchable material layer 304 with an inner and outer surface, skin layer 306 which has an inner layer and an out layer, the inner layer of the skin layer 306 is permanently adhered to said outer surface of said 4-way stretchable material layer 304. 4-way stretchable material layer 304 is releasably adhered to railing 302.

Figure 10:
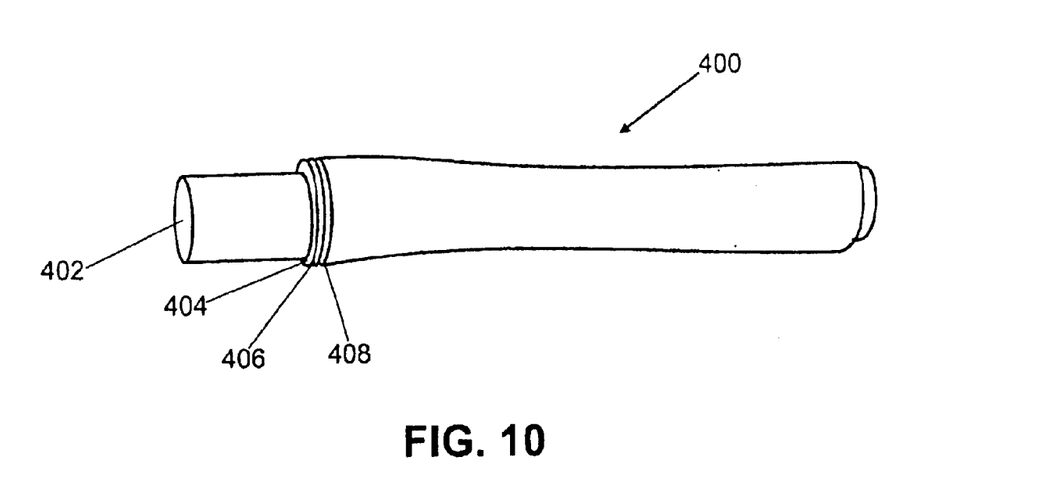
FIG. 10 shows a method of wrapping the grip of FIG. 4.

FIG. 10 discloses another embodiment of a system of providing a secure, safe, releasably attachable grip on a railing. The system of the present invention can be utilized with any type of railing or hand support system 402. Grip 400 of the present invention has 4-way-stretchable layer 404 with an inner and outer surface, backing layer 406 with an inner and outer surface, and skin layer 408 which has an inner surface and an outer surface, the inner surface of the skin layer 408 is permanently adhered to said outer surface of said backing layer 406. The inner surface of backing layer 406 is permanently adhered to 4-way stretchable layer 404. 4-way stretchable layer 404 is releasably adhered to railing 402.

Figure 11:
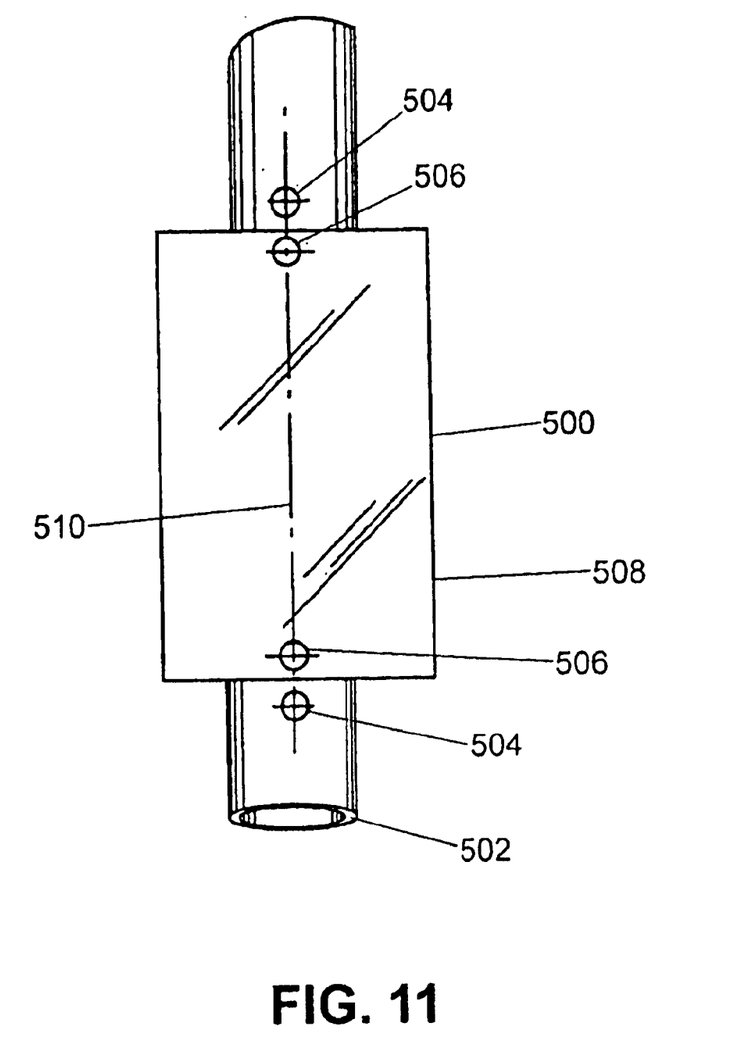
FIG. 11 shows a method of wrapping the grip of the present invention using the alignments targets as described in the present invention.

FIG. 11 discloses a method of enveloping the railing with the grip of the present invention. In one embodiment, grip 500 has alignment targets 506 along axis 510 parallel to lengthwise edge 508 of grip 500. Next, alignment targets 504 are placed on railing 502. Next, grip 500 is placed on the railing so that the center lengthwise axis of the grip is centered on the axis parallel to the length of railing 502. Next, grip 500 alignment targets 506 are aligned with railing 502 alignment targets 504. Finally, grip 500 has a width substantially similar to the circumference of railing 502 such that when grip 500 is folded around railing 502 edges 508 of grip 500 abut.

Figure 12:
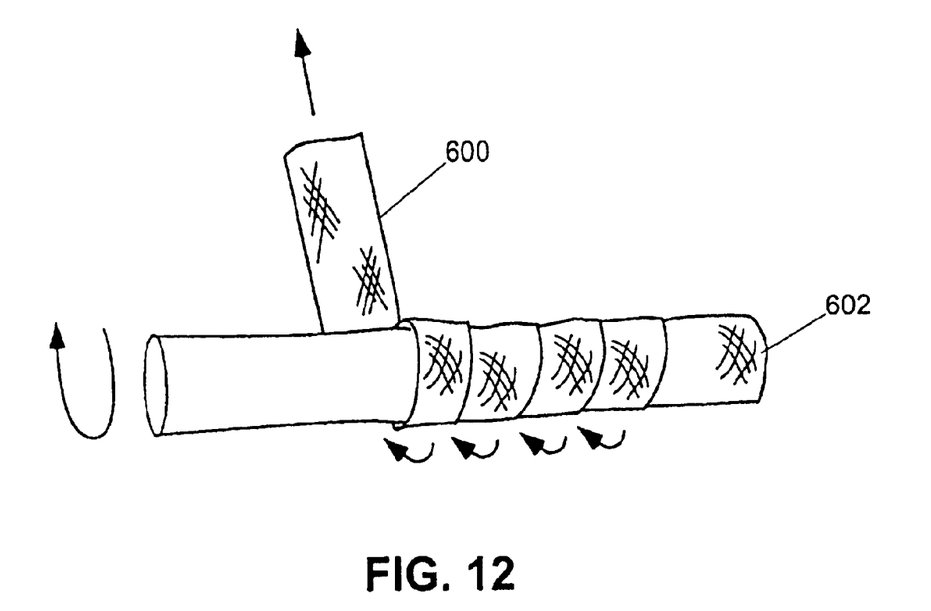
FIG. 12 shows a method of spirally wrapping the grip of FIG. 1 or FIG. 4.

In another method of wrapping, FIG. 12 discloses a method of spirally wrapping a railing 602 with grip 600. Next, grip 600 is wrapped, placing the tapered edge of grip 600 spirally around the railing such that the tapered edges of grip 600 overlap. The length of railing 602 may be fully covered by grip 600 such that the fully covers railing 602 and the thickness of grip 600 remains constant. In an alternative embodiment, grip 600 may be wrapped around the railing so that the edges do not overlap to provide additional friction to the user.

Figure 13A:
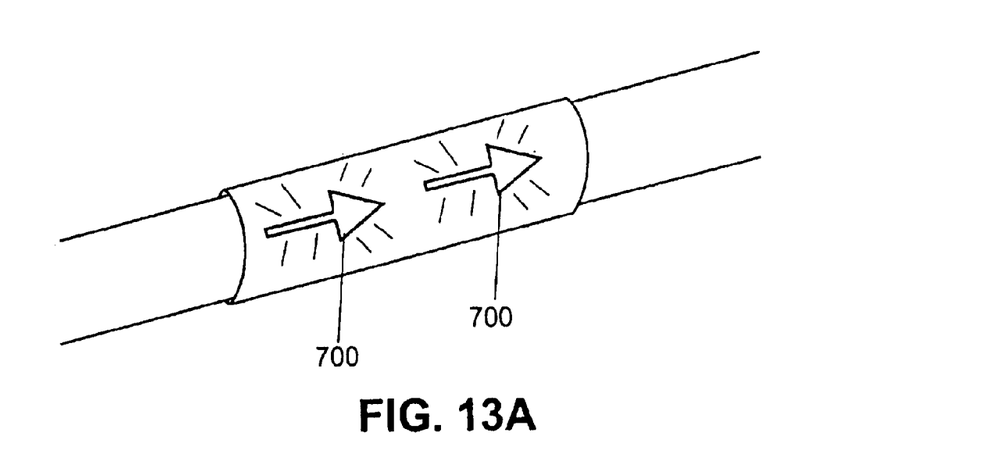
FIG. 13A and FIG. 13B shows the grip of the present invention having light emitting means incorporated within the grip.
Figure 13B:
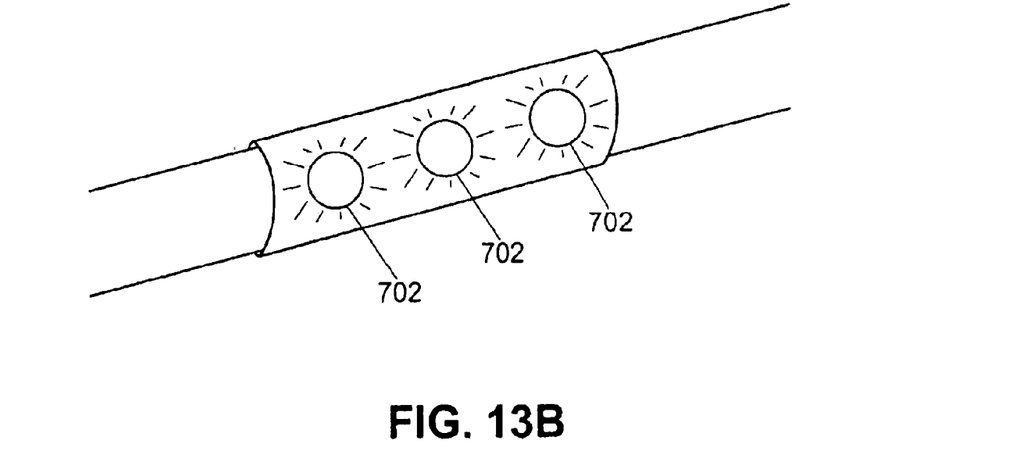

FIG. 13A and FIG. 13B shows the grip of the present invention incorporating a light emitting means within the grip. As stated above, luminescent material may be used to enhance any graphic material that may be on the surface of grips 100 and 200. Other materials that may be used to create this effect include phosphorescent chemicals, low grade radiant materials, electrically stimulated phosphorescent materials, fiber optics and luminescent pigments. These chemicals can be included in the inks used create graphics 700 laminated or affixed to the grip surface. In addition, a low level electrical current may be passed through the grip surfaces to emit light by, for example, a light emitting filament 702. An independent power source such as a battery may be used to provide the current source. A means for turning on the current in no light or low light situations such as a solar switch is used to complete the circuit. Another source of light can be provided by placing the grip over a light emitting back drop material. In this instance, flexible light emitting diode (LED) material can be used. The examples given here are examples only and are not to be used as limitations.

Figure 14:
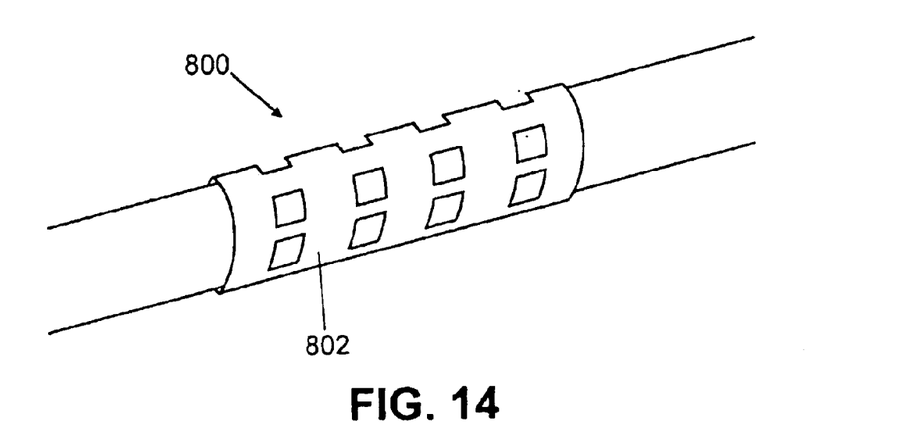
FIG. 14 shows the grip of the present invention having textured surfaces incorporated within the grip.
Figure 16:
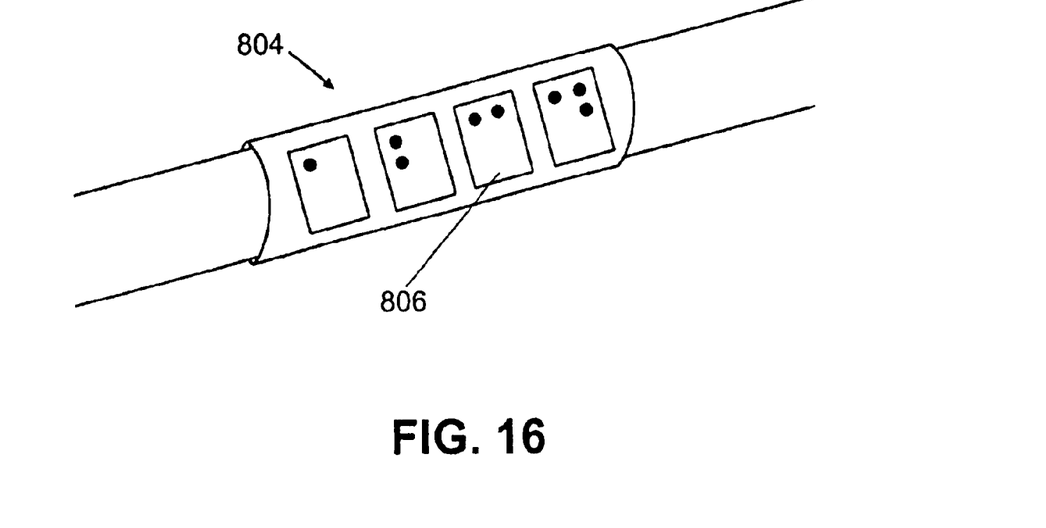
FIG. 16 shows the grip of the present invention having Braille language symbols incorporated within the grip.

FIG. 14 shows the grip of the present invention with textured surfaces. Grip 800 has a textured surface. Grip 800 adds a textured surface 802 to grip 100 or 200. Textured surface 802 can be formed from a variety of materials. For instance, hard rubber, soft crayon rubber, plastics of any type, woven material and any other material known in the art suitable for this purpose. In addition, patterns, such as Braille symbols for the vision impaired or safety instructions can be molded into the surface of the grip. FIG. 16 illustrates the use of Braille symbols 806 on a grip 804.

An additional property of the textured grip is insulation effect. The thickness of the textured surface 802 acts as a natural insulator. This property makes the railing usable in extremely hot or cold weather conditions. In addition, fire retardants such as bromine based retardants, phosphate based retardants, or Tetrabromobisphenol A (TBBPA) epoxy can be added to the textured surface making the grip 800 fire resistant and safer for human use.

Figure 15:
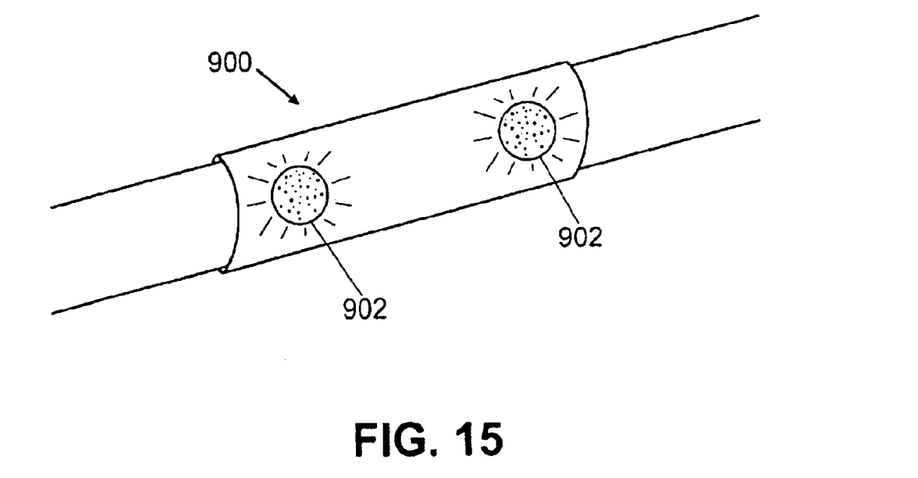
FIG. 15 shows the grip of the present invention having sound emitting means incorporated within the grip.

FIG. 15 shows the grip 900 of the present invention having sound emitting means 902 incorporated within the grip. As is well known to those skilled in the art of sound technology, sound emitting means 902 can be activated by using a pressure sensitive switch which will transmit a signal to a preprogrammed microchip. Once the sound emitting means is activated, the speakers that emit the sound are activated. In one embodiment, each sound unit is independently powered by battery pack. In another embodiment, a solar switch may be used to turn on the sound emitting means. In this embodiment, when the lights are turned off, a signal is sent to a preprogrammed microchip that turns on the sound emitting means.

What is claimed is:

1. A grip for a railing or pole having an outer surface comprising:
    a body having a first side and a second side opposite said first side;
    a light emitting means integral with said first side of said body;
    a stretchable material having a top surface and a bottom surface opposite said top surface, said top surface adhered to said second side of said body; and
    a releasable adhesive disposed on said bottom surface of said stretchable material to adhere said bottom surface of said stretchable material to the outer surface.

2. The grip of claim 1, wherein said body comprises a distance between said first side and said second side, said distance being variable.

3. The grip of claim 1, wherein said body comprises a material selected from a group consisting of leather, plastic sheeting, plastic roll stock, foam material, polyurethane, woven fabric, urethane, rubber and foil.

4. The grip of claim 1, wherein said stretchable material is polyester.

5. The grip of claim 1, wherein said light emitting means is a luminescent material.

6. The grip of claim 1, wherein said light emitting means is a material selected from a group of materials consisting of phosphorescent chemicals, low grade radiant materials, electrically stimulated phosphorescent materials, and luminescent pigments.

7. The grip of claim 1, wherein said light emitting means is selected from a group consisting of fiber optics and flexible light emitting diodes.

8. The grip of claim 1, wherein said light emitting means is provided by a low level electric current.

9. The grip of claim 1, wherein said light emitting means is a light emitting filament.

10. The grip of claim 1, further comprising:
    a backing layer adhered between said body and said stretchable material.

11. The grip of claim 10, wherein the grip substantially covers the outer surface.

12. The grip of claim 1, wherein the grip substantially covers the outer surface.

* * * * *